(12) United States Patent
Lin et al.

(10) Patent No.: US 11,714,299 B2
(45) Date of Patent: *Aug. 1, 2023

(54) HEATER STRUCTURE CONFIGURED TO IMPROVE THERMAL EFFICIENCY IN A MODULATOR DEVICE

(71) Applicant: Taiwan Semiconductor Manufacturing Company, Ltd., Hsin-Chu (TW)

(72) Inventors: Shih-Wei Lin, Taipei (TW); Ming Chyi Liu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 29 days.

This patent is subject to a terminal disclaimer.

(21) Appl. No.: 17/556,006

(22) Filed: Dec. 20, 2021

(65) Prior Publication Data

US 2022/0113564 A1  Apr. 14, 2022

Related U.S. Application Data

(63) Continuation of application No. 16/733,488, filed on Jan. 3, 2020, now Pat. No. 11,209,673.

(Continued)

(51) Int. Cl.
*G02F 1/01* (2006.01)
*G02F 1/225* (2006.01)
*G02B 6/12* (2006.01)

(52) U.S. Cl.
CPC ............ *G02F 1/011* (2013.01); *G02F 1/0147* (2013.01); *G02F 1/2257* (2013.01); *G02B 2006/12142* (2013.01); *G02F 2203/50* (2013.01)

(58) Field of Classification Search
CPC ...... G02F 1/011; G02F 1/0147; G02F 1/2257; G02F 2203/50; G02B 2006/12142
(Continued)

(56) References Cited

U.S. PATENT DOCUMENTS 5,091,983 A    2/1992  Lukosz
6,240,226 B1   5/2001  Presby et al.
(Continued)

FOREIGN PATENT DOCUMENTS

KR    20110092044 A    8/2011

OTHER PUBLICATIONS

Non-Final Office Action dated Sep. 30, 2020 for U.S. Appl. No. 16/733,488.
(Continued)

*Primary Examiner* — Robert Tavlykaev
(74) *Attorney, Agent, or Firm* — Eschweiler & Potashnik, LLC

(57) ABSTRACT

Various embodiments of the present disclosure are directed towards an integrated chip including a waveguide and a heater structure. The waveguide is disposed on a substrate and comprises an active region that extends continuously along a first distance. The heater structure overlies the waveguide. The heater structure comprises a conductive structure over the active region and a vertical structure disposed between the conductive structure and the substrate. The vertical structure comprises a conductive upper vertical segment and a lower vertical segment. The conductive structure and the conductive upper vertical segment continuously laterally extend across a second distance that is greater than or equal to the first distance. The first distance is greater than a width of the conductive structure.

20 Claims, 10 Drawing Sheets

Related U.S. Application Data

(60) Provisional application No. 62/927,850, filed on Oct. 30, 2019.

(58) Field of Classification Search
USPC .................................................. 385/1–3
See application file for complete search history.

(56) References Cited

U.S. PATENT DOCUMENTS

| | | | |
|---|---|---|---|
| 6,366,730 | B1 | 4/2002 | Cappuzzo et al. |
| 6,954,561 | B1 | 10/2005 | Khan et al. |
| 7,333,679 | B2 | 2/2008 | Takahashi |
| 7,509,005 | B2 | 3/2009 | Sanhu et al. |
| 9,946,099 | B2 | 4/2018 | Gill et al. |
| 10,656,442 | B2 | 5/2020 | Ida et al. |
| 10,739,622 | B2 | 8/2020 | Roth et al. |
| 2004/0071386 | A1 | 4/2004 | Nunen et al. |
| 2004/0146247 | A1 | 7/2004 | Tsai et al. |
| 2005/0089275 | A1 | 4/2005 | Oikawa et al. |
| 2005/0094916 | A1* | 5/2005 | Sims .............. G02B 6/3538 385/5 |
| 2005/0232543 | A1 | 10/2005 | Tsai et al. |
| 2005/0254743 | A1 | 11/2005 | Akiyama et al. |
| 2006/0165340 | A1 | 7/2006 | Wu |
| 2010/0054653 | A1* | 3/2010 | Carothers .............. G02B 6/122 438/682 |
| 2010/0092682 | A1 | 4/2010 | Carothers et al. |
| 2012/0087613 | A1 | 4/2012 | Rasras |
| 2012/0146193 | A1 | 6/2012 | Stuber et al. |
| 2012/0195547 | A1 | 8/2012 | Rasras |
| 2014/0161387 | A1 | 6/2014 | Ide et al. |
| 2016/0170239 | A1 | 6/2016 | Feng et al. |
| 2016/0282557 | A1 | 9/2016 | Qian et al. |
| 2020/0057319 | A1 | 2/2020 | Caer et al. |

OTHER PUBLICATIONS

Final Office Action dated Apr. 15, 2021 for U.S. Appl. No. 16/733,488.
Notice of Allowance dated Aug. 18, 2021 for U.S. Appl. No. 16/733,488.
"Thermal Conductivity" by Powell et al, American Institute of Physics Handbook, 3rd Edition, Chap 4g, 4-142-4-162, McGraw Hill (Year: 1971).

* cited by examiner

HEATER STRUCTURE CONFIGURED TO IMPROVE THERMAL EFFICIENCY IN A MODULATOR DEVICE

REFERENCE TO RELATED APPLICATIONS

This application is a Continuation of U.S. application Ser. No. 16/733,488, filed on Jan. 3, 2020, which claims the benefit of U.S. Provisional Application No. 62/927,850, filed on Oct. 30, 2019. The contents of the above-referenced patent applications are hereby incorporated by reference in their entirety.

BACKGROUND

Optical circuits may comprise multiple photonic functions/devices and optical waveguides. The optical waveguides are configured to confine and guide light from a first point on an integrated chip (IC) to a second point on the IC with minimal attenuation. An optical waveguide in a modulator device may be configured to selectively change the phase, wavelength, frequency, and/or other properties of light that passes through the optical waveguide.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
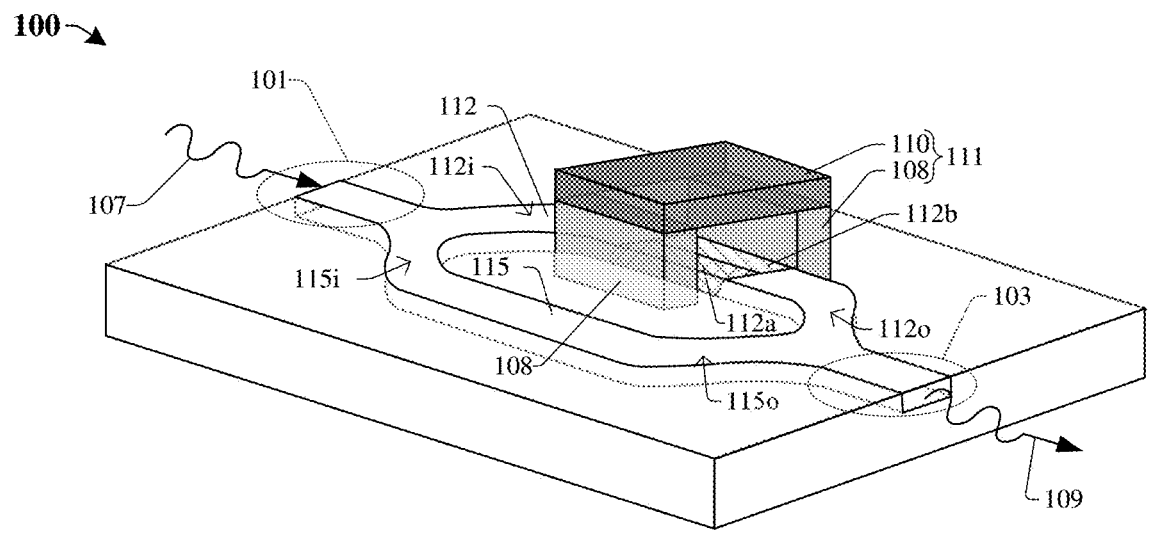
FIG. 1 illustrates a perspective view of some embodiments of a modulator device comprising a heater structure that at least partially laterally surrounds a waveguide structure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In electronics and telecommunications, modulation is the process of varying one or more properties of a periodic waveform in a manner that allows information to be transmitted from a transmitter to a receiver. For example, amplitude modulation (AM), frequency modulation (FM), and phase modulation can be used to modulate the periodic waveform to convey the information over long or short distances.

A modulator device may include an input terminal and an output terminal. A first waveguide and a second waveguide may branch off from the input terminal and then recombine at the output terminal, such that there are two pathways or channels through which light can travel through the modulator device. The first waveguide may be in close proximity or in direct contact with the second waveguide, such that the first and second waveguides are optically coupled to one another. During operation of the modulator device, input light is received at the input terminal with an initial phase, and is then split to pass along the first waveguide and the second waveguide, before being recombined and provided as output light at the output terminal. Because the first and second waveguides are optically coupled together, the output light can be phase shifted due to constructive or destructive interference arising from the first and second waveguides.

A heater structure may be arranged over, under, and/or alongside the first waveguide to generate and apply heat to the first waveguide. This heat can induce a change in temperature of the first waveguide, which in turn changes the refractive index, carrier mobility, and/or other characteristics of the first waveguide, relative to that of the second waveguide. Thus, the velocity and/or phase of the light traveling through the first waveguide can be shifted relative to that of the light traveling through the second waveguide, such that the temperature of the heater structure can control a phase shift imparted to the outgoing light at the output terminal. Thus, the modulator device can control the temperature of the heater structure, such that the input light is modulated to provide output light whose modulation corresponds to various data states to be transmitted. However, the heater structure may overlie the first waveguide, such that a bottom surface of the heater structure is vertically offset from an upper surface of the first waveguide by a non-zero distance. Dielectric material is disposed between the heater structure and the first waveguide. Further, the heat may radiate in all directions from the heater structure, such that heat is not focused towards the first waveguide and a thermal efficiency of the modulator device is decreased. In order to account for the heat radiating in all directions, an amount of power delivered to the heater structure may be increased (thereby increasing heat generated by the heater structure) to compensate for the power that radiates away from the first waveguide. This, in turn, may increase a power consumption of the modulator device and further decrease thermal efficiency of the modulator device.

Various embodiments of the present application are directed towards a modulator device including a heater structure that overlies and at least partially laterally encloses a waveguide structure. For example, the modulator device includes an interconnect dielectric structure overlying the waveguide structure. The heater structure is disposed within the interconnect dielectric structure and overlies the waveguide structure. The heater structure may include an upper conductive body and a heater pillar structure. The upper conductive body directly overlies the waveguide structure and is vertically offset from the waveguide structure by the interconnect dielectric structure. The heater pillar structure underlies the upper conductive body and extends from the upper conductive body to a point below an upper surface of the waveguide structure. The waveguide structure is spaced laterally between inner sidewalls of the heater pillar structure, such that the heater structure directly overlies the waveguide structure and at least partially laterally surrounds the waveguide structure. The heater structure is configured to focus heat towards the waveguide structure, such that heat generated by the heater structure may control a phase shift of light passing through the waveguide structure. Because the waveguide structure is spaced laterally between inner sidewalls of the heater structure, heat may be more directly radiated towards the waveguide structure. This, in part, may increase a thermal efficiency of the modulator device and may decrease a power consumption of the modulator device.

FIG. 1 illustrates a perspective view of some embodiments of a modulator device 100 including a first waveguide 112 spaced laterally between inner sidewalls of the heater structure 111.

The modulator device 100 includes an input terminal 101 and an output terminal 103. The first waveguide 112 and a second waveguide 115 branch off from the input terminal 101, and then recombine at the output terminal 103, thereby providing two pathways or channels through which light can travel through the modulator device 100. In some embodiments, the first and second waveguides 112, 115 branch off symmetrically between the input terminal 101 and the output terminal 103. The first waveguide 112 may be in close proximity to or in direct contact with the second waveguide 115, such that the first and second waveguides 112, 115 are optically coupled to one another. In some embodiments, the first waveguide 112 has a first input region 112$i$ coupled to the input terminal 101 and a first output region 112$o$ coupled to the output terminal 103. Further, the second waveguide 115 has a second input region 115$i$ coupled to the input terminal 101 and a second output region 115$o$ coupled to the output terminal 103. In some embodiments, the first waveguide 112 comprises a semiconductor material (e.g., silicon) and may have an active region that includes a first doped region 112$a$ and a second doped region 112$b$. In some embodiments, the first doped region 112$a$ comprises a first doping type (e.g., p-type) and the second doped region 112$b$ comprises a second doping type (e.g. n-type) opposite the first doping type. In further embodiments, the first doping type is n-type and the second doping type is p-type, or vice versa.

The heater structure 111 overlies the active region of the first waveguide 112. In some embodiments, the heater structure 111 includes an upper conductive body 110 and a heater pillar structure 108. The upper conductive body 110 directly overlies the first and second doped regions 112$a$, 112$b$. The heater pillar structure 108 continuously extends from a lower surface of the upper conductive body 110 to a point below an upper surface of the first waveguide 112. Further, the active region of the first waveguide 112 is spaced laterally between inner sidewalls of the heater pillar structure 108, such that the heater structure 111 at least partially laterally surrounds the first waveguide 112. In some embodiments, a bottom surface of the heater pillar structure 108 is aligned with a bottom surface of the first waveguide 112. Furthermore, the upper conductive body 110 and the heater pillar structure 108 comprise one or more materials with high thermal conductivity. For example, an interconnect dielectric structure (not shown) may be disposed around the first waveguide 112 and the heater structure 111, in which the one or more materials of the heater structure 111 have a higher thermal conductivity than material(s) the interconnect dielectric structure is comprised of.

In some embodiments, during operation of the modulator device 100, impingent light 107 is received at the input terminal 101 with an initial phase, and is then split to pass along the first waveguide 112 and the second waveguide 115, before being recombined and provided as outgoing light 109 at the output terminal 103. Because the first waveguide 112 and the second waveguide 115 are optically coupled, the outgoing light 109 can be phase shifted due to constructive or destructive interference arising from the first and second waveguides 112, 115. In some embodiments, the heater structure 111 is configured to generate and apply heat to the active region of the first waveguide 112. The heat generated by the heater structure 111 can induce a change in temperature of the first waveguide, which in turn changes the refractive index, carrier mobility, and/or other characteristics of the first waveguide 112, relative to that of the second waveguide 115. Thus, the velocity and/or phase of the light traveling through the first waveguide 112 can be shifted relative to that of the light travelling through the second waveguide 115, such that the temperature of the heater structure 111 can control a phase shift imparted to the outgoing light 109 at the output terminal 103. Further, the modulator device 100 is configured to control a temperature of the heat generated by the heater structure 111 in time based on data states that are to be transmitted in time, such that the impingent light 107 is modulated to provide outgoing light 109 whose modulation corresponds to various data states to be transmitted. It will be appreciated that although a modulation example that makes use of phase modulation is described above, in other embodiments other types of modulation, such as amplitude modulation or frequency modulation for example, could also be used.

By virtue of the heater structure 111 directly overlying and at least partially laterally surrounding the active region of the first waveguide 112, the heater structure 111 may direct the heat towards the first and second doped regions 112$a$, 112$b$. This in turn may reduce an amount of heat that may be radiated towards and/or absorbed by adjacent structures and/or dielectric materials, thereby increasing a thermal efficiency of the modulator device 100. Further, the heater structure 111 comprises one or more materials with high thermal conductivity, thereby increasing a thermal efficiency of the modulator device 100. Thus, the heater structure 111 may decrease a power consumption of the modulator device 100 and increase a thermal efficiency of the modulator device 100.

Figure 2A:
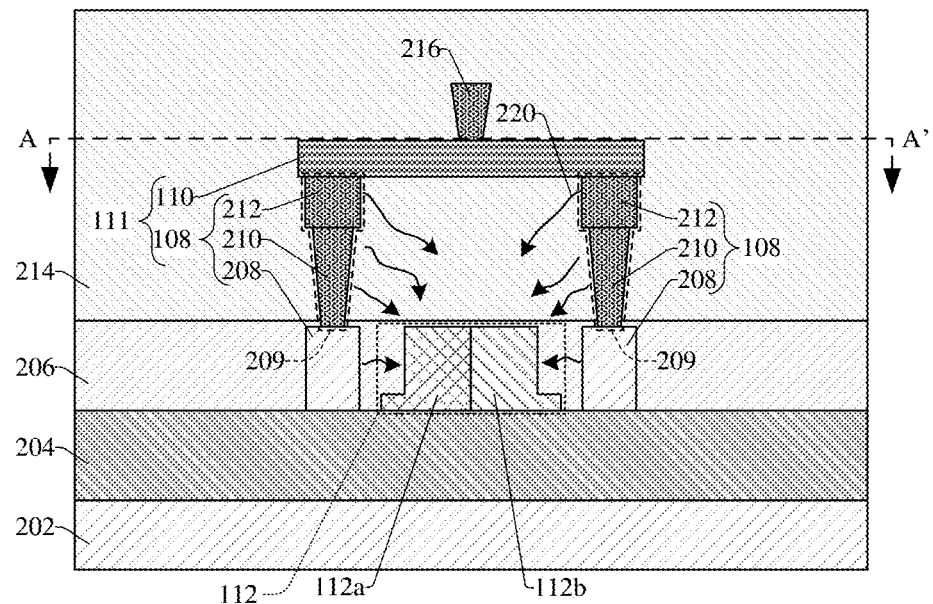
FIGS. 2A and 2B illustrate cross-sectional views of some embodiments of a waveguide structure spaced laterally between inner sidewalls of a heater structure.

FIG. 2A illustrates a cross-sectional view of some embodiments of a modulator device 200a having a heater structure 111 with an upper conductive body 110 and a heater pillar structure 108.

In some embodiments, the modulator device 200a comprises a first waveguide 112 overlying a substrate 202. A bulk dielectric structure 204 is arranged over the substrate 202 and may be spaced between the first waveguide 112 and the substrate 202. A lower inter-level dielectric (ILD) structure 206 overlies the bulk dielectric structure 204. In some embodiments, the first waveguide 112 is arranged directly over the bulk dielectric structure 204 and the lower ILD structure 206 laterally encloses the first waveguide 112. In some embodiments, the bulk dielectric structure 204 may, for example, be or comprise an oxide, such as silicon dioxide, another suitable oxide, a low-k dielectric material, any combination of the foregoing, or another suitable dielectric material. In further embodiments, the lower ILD structure 206 may, for example, be or comprise silicon nitride, silicon carbide, silicon oxide, a low-k dielectric material, an extreme low-k dielectric material, any combination of the foregoing, or another suitable dielectric material. In some embodiments, the substrate 202 may, for example, be or comprise a semiconductor body such as monocrystalline silicon, a silicon-on-insulator substrate (SOI), or another suitable semiconductor substrate material. In various embodiments, the substrate 202 and the first waveguide 112 comprise a same material (e.g., silicon).

In some embodiments, the first waveguide 112 comprises a semiconductor material (e.g., silicon) configured to transport light. The first waveguide 112 may have a first doped region 112a and a second doped region 112b laterally spaced adjacent to one another. In some embodiments, the first doped region 112a comprises a first doping type (e.g., p-type) and the second doped region 112b comprises a second doping type (e.g., n-type) opposite the first doping type. In further embodiments, the first doping type is p-type and the second doping type is n-type, or vice versa. In yet further embodiments, the first and/or second doped regions 112a, 112b are electrically coupled to one or more conductive vias and/or wires (not shown) disposed within the lower ILD structure 206 and/or an upper ILD structure 214. In various embodiments, a bias is applied across the first doped region 112a and the second doped region 112b of the first waveguide 112, through the conductive vias and/or wires (not shown), in a first direction to change the phase of light traveling through the active region of the first waveguide 112. In such embodiments, the light travels in a second direction perpendicular to the first direction.

The heater structure 111 overlies the first waveguide 112 and is disposed within the lower ILD structure 206 and/or the upper ILD structure 214. In some embodiments, the heater structure 111 includes an upper conductive body 110 and a heater pillar structure 108. The heater pillar structure 108 extends continuously from a lower surface of the upper conductive body 110 to an upper surface of the bulk dielectric structure 204. Further, the first waveguide 112 is spaced laterally between inner sidewalls of the heater pillar structure 108. In various embodiments, the heater pillar structure 108 includes a lower pillar structure 208 and an upper pillar structure 209 overlying the lower pillar structure 208. In some embodiments, the lower pillar structure 208 may, for example, be or comprise a semiconductor substrate material, silicon, intrinsic silicon, p-doped silicon, n-doped silicon, polysilicon, or another suitable material. In further embodiments, the lower pillar structure 208 comprises a same material (e.g., silicon) as the first waveguide 112. Further, in some embodiments, a bottom surface of the lower pillar structure 208 is aligned with a bottom surface of the first waveguide 112, and a top surface of the lower pillar structure 208 is aligned with a top surface of the first waveguide 112. The upper pillar structure 209 continuously extends from the upper conductive body 110 to the lower pillar structure 208. In some embodiments, the upper pillar structure 209 includes a heater via 210 and a heater wire 212 overlying the heater via 210. A conductive via 216 overlies the upper conductive body 110 and is electrically coupled to the heater structure 111. In some embodiments, the conductive via 216, the heater via 210, and/or the heater wire 212 may, for example, respectively be or comprise tungsten, aluminum, copper, any combination of the foregoing, or the like. In yet further embodiments, the upper conductive body 110 may, for example, be or comprise titanium, tantalum, titanium nitride, tantalum nitride, any combination of the foregoing, or the like.

Further, upon application of a suitable signal (e.g., a voltage, a current, etc.), the heater structure 111 comprises one or more materials that generates heat, as illustrated by exemplary heat waves 220. The heater structure 111 is configured to apply heat to the first waveguide 112 to change the refractive index of the first waveguide 112, thereby changing the phase of light as it travels through the active region of the first waveguide 112. During operation, the change in the phase of light depends on the change of temperature of the first waveguide 112 by the following equation: $\Delta\varphi=2\pi*dn/dT*\Delta T*L/\lambda$, where $dn/dT$ is the thermo-optic coefficient of the material of the first waveguide 112, $\Delta T$ is the change in temperature of the first waveguide 112, L is the length that the light travels when exposed to the heater structure 111, and $\lambda$ is the wavelength of light. For example, in some embodiments, the first waveguide 112 comprises silicon, which has a thermo-optic coefficient of about $1.86\times10^{-4}$ per Kelvin, which indicates that the refractive index of silicon changes by $1.1\times10^{-3}$ for every 6 Kelvin (or 6 degrees Celsius) temperature change.

By virtue of the upper conductive body 110 overlying the heater pillar structure 108, heat may conduct from the upper conductive body 110 to the upper pillar structure 209 and the lower pillar structure 208. Because the upper pillar structure 209 and the lower pillar structure 208 are in closer proximity to the first waveguide 112 than the upper conductive body 110, heat may more effectively be directed to the first waveguide 112. This, in turn, may increase a thermal efficiency of the modulator device 100 and decrease a power consumption of the modulator device 100. Further, by virtue of the upper conductive body 110 directly overlying the first waveguide 112 and the heater pillar structure 108 at least partially laterally enclosing the first waveguide 112, the heater structure 111 may confine the exemplary heat waves 220 to an area around the active region (e.g., the first and/or second doped regions 112a, 112b) of the first waveguide 112. This may prevent the exemplary heat waves 220 from radiating to another device and/or structure disposed over the substrate 202, thereby further increasing the thermal efficiency of the modulator device 100. In addition, this may further reduce the power consumption of the modulator device 100.

Further, the heater structure 111 may comprise a material (s) with a higher thermal conductivity than surrounding dielectric material(s) and/or structure(s), such that the heater structure 111 may effectively produce and direct heat towards the active region of the first waveguide 112. In some embodiments, the lower pillar structure 208 comprises a first material(s) (e.g., intrinsic silicon) with a first thermal conductivity, the upper pillar structure 209 comprises a second material(s) (e.g., aluminum, copper, tungsten, any combination of the foregoing, etc.) with a second thermal conductivity, the upper conductive body 110 comprises a third material(s) (e.g., titanium nitride, tantalum nitride, titanium, etc.) with a third thermal conductivity, and the lower ILD structure 206 and/or an upper ILD structure 214 comprise a dielectric material(s) (e.g., silicon oxide, a low-k dielectric material, silicon carbide, a combination of the foregoing, etc.) with a fourth thermal conductivity. The fourth thermal conductivity is less than the first thermal conductivity, the second thermal conductivity, and the third thermal conductivity, respectively, such that heat generated by the heater structure 111 may be effectively conducted from the upper conductive body 110 to the heater pillar structure 108. Because the heater pillar structure 108 is in closer proximity to the first waveguide 112 than the upper conductive body 110, heat may be more easily directed towards the first waveguide 112. Thus, the heater structure 111 may conduct heat towards the first waveguide 112 more easily than the lower ILD structure 206 and/or upper ILD structure 214 may conduct the heat away from the first waveguide 112. This, in turn, may further increase the thermal efficiency of the modulator device 200a and/or decrease power consumption of the modulator device 200a.

In some embodiments, the first thermal conductivity of the lower pillar structure 208 may be about 150 watts per meter kelvin (W/(m*K)) or within a range of about 125 to 175 W/(m*K). In some embodiments, the second thermal conductivity of the upper pillar structure 209 may be about 225 W/(m*K), about 400 W/(m*K), or within a range of about 210 to 420 W/(m*K). Thus, in some embodiments, the first thermal conductivity of the lower pillar structure 208 may be less than the second thermal conductivity of the upper pillar structure 209. In some embodiments, the third thermal conductivity of the upper conductive body 110 may be about 12 W/(m*K), about 12 W/(m*K), about 60 W/(m*K), or within a range of about 10 to 100 W/(m*K). In further embodiments, the fourth thermal conductivity of the dielectric layer(s) and/or structure(s) (e.g., the lower ILD structure 206 and/or upper ILD structure 214) surrounding the heater structure 111 and/or the first waveguide 112 may be about 1 W/(m*K), about 5 W/(m*K), or within a range of about 0.5 to 50 W/(m*K).

Figure 2B:
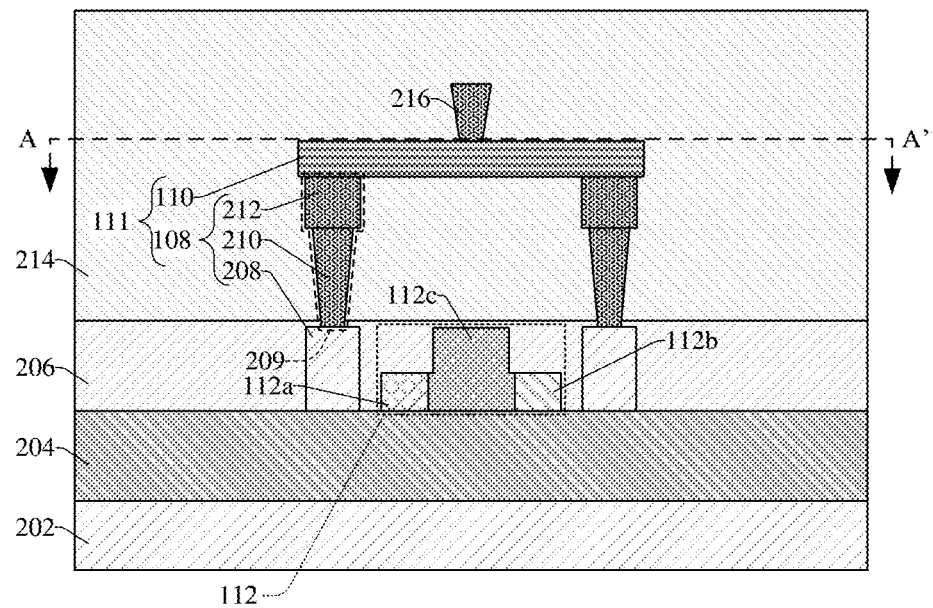

FIG. 2B illustrates a cross-sectional view of some embodiments of a modulator device 200b comprising a heater structure 111 overlying and at least partially laterally surrounding a first waveguide 112.

In some embodiments, the first waveguide 112 comprises a substrate material (e.g., silicon) and comprises a first doped region 112a, a second doped region 112b, and a center undoped region 112c disposed laterally between the first and second doped regions 112a, 112b. The first doped region 112a may, for example, comprise a first doping type (e.g., n-type), and the second doped region 112b may, for example, comprise a second doping type (e.g., p-type) opposite the first doping type. In further embodiments, the center undoped region 112c may be or comprise intrinsic silicon. In some embodiments, the first and second doped regions 112a, 112b may have topmost surfaces that are disposed beneath a topmost surface of the center undoped region 112c. In some embodiments, the first and second doped regions 112a, 112b are directly electrically coupled to one or more conductive vias and/or wires (not shown). In such embodiments, a bias may be applied across the first and second doped regions 112a, 112b in a first direction to change the phase of light traveling through the active region of the first waveguide 112, where the light travels in a second direction perpendicular to the first direction. In further embodiments, a topmost surface of the lower pillar structure 208 is aligned with the topmost surface of the center undoped region 112c.

Figure 3A:
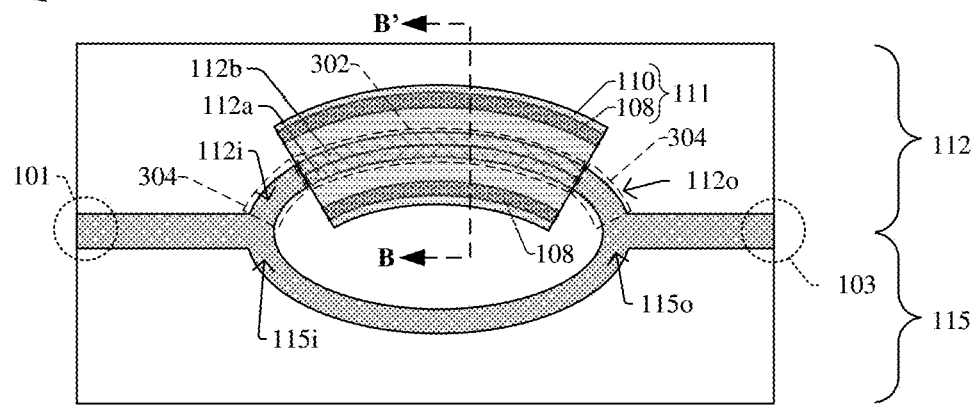
FIGS. 3A-C illustrate top views of some embodiments of a modulator device comprising a heater structure that directly overlies and at least partially laterally surrounds a first waveguide, where the first waveguide is directly connected to a second waveguide.

FIG. 3A illustrates a top view 300a of some embodiments of a modulator device comprising a heater structure 111 that directly overlies and at least partially laterally surrounds a first waveguide 112, where the first waveguide 112 is directly connected to a second waveguide 115. In some embodiments, the top view 300a of FIG. 3A corresponds to some alternative embodiments of the modulator device 200a of FIG. 2A taken along the line A-A' of FIG. 2A. In further embodiments, the cross-sectional view of FIG. 2A may have been taken from the line B-B' of FIG. 3A.

An active region 302 of the first waveguide 112 may comprise the first and second doped regions 112a, 112b of the first waveguide 112 and at least a portion of the heater structure 111. In some embodiments, the active region 302 of the first waveguide 112 resembles a curved rectangular structure when viewed from above. The active region 302 may be continuously connected with an inactive region 304 of the first waveguide 112. In some embodiments, the inactive region 304 of the first waveguide 112 may, for example, be or comprise undoped silicon, intrinsic silicon, or the like. In further embodiments, the second waveguide 115 directly contacts the first waveguide 112 and may, for example, comprise a same material as the inactive region 304 of the first waveguide 112 (e.g., intrinsic silicon). Thus, the first waveguide 112 is optically coupled to the second waveguide 115. Further, the heater structure 111 overlies the active region 302 and is configured to generate and direct heat to the active region 302 of the first waveguide 112. The heater structure 111 includes the upper conductive body 110 and the heater pillar structure 108, such that the active region 302 of the first waveguide 112 is spaced laterally between sidewalls of the heater pillar structure 108. This, in part, facilitates the heater structure 111 generating and confining heat to the active region 302, such that the heat may affect the phase of light traveling through the first waveguide 112. In some embodiments, the upper conductive body 110 and/or the heater pillar structure 108 each have a curved rectangular structure that conforms to a shape of the active region 302 of the first waveguide 112. Thus, the heater structure 111 is configured to generate and confine heat to the active region 302 of the first waveguide 112, thereby increasing a thermal efficiency of the modulator device and decreasing a power consumption of the modulator device.

Figure 3B:
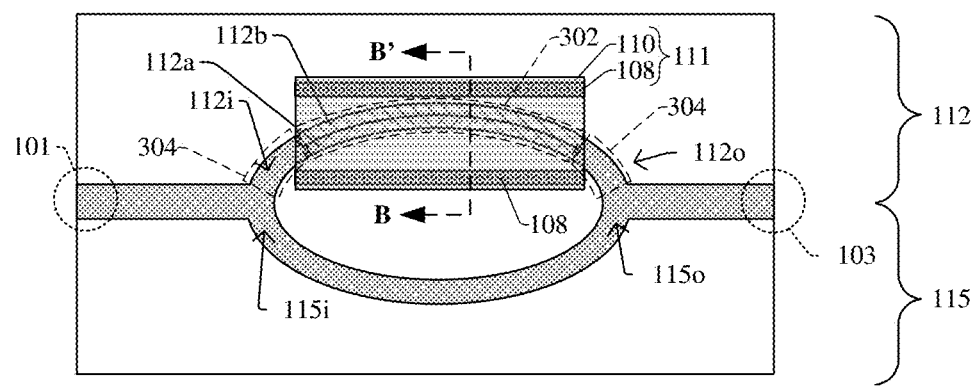

FIG. 3B illustrates a top view 300b of some embodiments of a modulator device comprising a heater structure 111 that directly overlies and at least partially laterally surrounds a first waveguide 112, where the first waveguide 112 is directly connected to a second waveguide 115. In some embodiments, the top view 300b of FIG. 3B corresponds to some alternative embodiments of the modulator device 200a of FIG. 2A taken along the line A-A' of FIG. 2A. In further embodiments, the cross-sectional view of FIG. 2A may have been taken from the line B-B' of FIG. 3A.

As illustrated in the top view 300b of FIG. 3B, when viewed from above, the upper conductive body 110 and the heater pillar structure 108 each have a rectangular shape that is different from the curved rectangular shape of the active region 302 of the first waveguide 112. Thus, the heater structure 111 overlies and at least partially laterally surrounds the active region 302, such that the heater structure 111 is configured to confine heat to the active region 302 of the first waveguide 112.

Figure 3C:
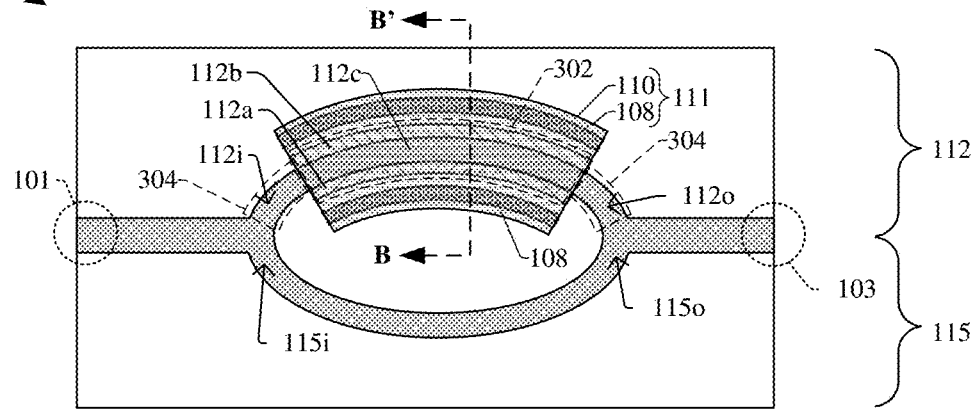

FIG. 3C illustrates a top view 300c of some embodiments of a modulator device comprising a heater structure 111 and a first waveguide 112, where the first waveguide 112 is directly connected to a second waveguide 115. In some embodiments, the top view 300c of FIG. 3C corresponds to some alternative embodiments of the modulator device 200b of FIG. 2B taken along the line A-A' of FIG. 2B. In further embodiments, the cross-sectional view of FIG. 2B may have been taken from the line B-B' of FIG. 3C.

The center undoped region 112c of the first waveguide 112 is sandwiched laterally between the first and second doped regions 112a, 112b of the first waveguide 112. Thus, the active region 302 comprises the center undoped region 112c, the first doped region 112a, and the second doped region 112b. The upper conductive body 110 of the heater structure 111 overlies the active region 302 of the first waveguide 112. Further, the active region 302 of the first waveguide 112 is spaced laterally between inner sidewalls of the heater pillar structure 108.

Figure 4A:
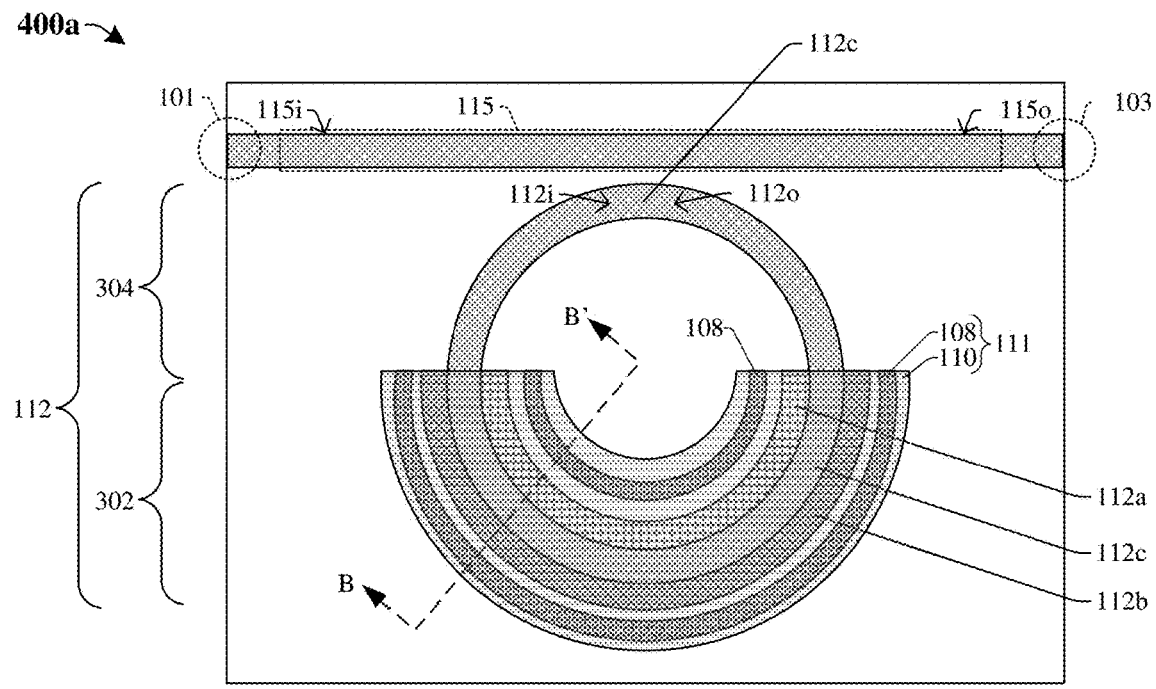
FIGS. 4A and 4B illustrate top views of some embodiments of a modulator device comprising a heater structure that directly overlies and at least partially laterally surrounds a first waveguide, where the first waveguide is laterally offset from a second waveguide.

FIG. 4A illustrates a top view 400a of some embodiments of a modulator device comprising a heater structure 111 that directly overlies a first waveguide 112, where the first waveguide 112 is laterally offset from a second waveguide 115. In some embodiments, the top view 400a of FIG. 4A corresponds to some alternative embodiments of the modulator device 200b of FIG. 2B taken along the line A-A' of FIG. 2B. In further embodiments, the cross-sectional view of FIG. 2B may have been taken from the line B-B' of FIG. 4A. Further, the top view 400a may correspond to some embodiments of the modulator device 200a of FIG. 2A taken along the line A-A' of FIG. 2A, wherein the center undoped region 112c is omitted and the first doped region 112a directly contacts the second doped region 112b (not shown). In such embodiments, the cross-sectional view of FIG. 2A may have been taken from the line B-B' of FIG. 4A.

In some embodiment, when viewed from above, the first waveguide 112 resembles a ring-like structure. An active region 302 of the first waveguide may comprise the heater structure 111, the first doped region 112a, the second doped region 112b, and the center undoped region 112c. The active region 302 may be continuously connect with an inactive region 304 of the first waveguide 112. The inactive region 304 may comprise the center undoped region 112c. Further, a second waveguide 115 is disposed laterally next to the first waveguide 112. In some embodiments, the second waveguide 115 comprises a same material as the center undoped region 112c of the first waveguide 112. In some embodiments, the second waveguide 115 may be substantially straight, such that input terminal 101, the second waveguide 115, and the output terminal 103 are collinear along a line within a plane. In other embodiments, the second waveguide may comprise some curved portions (not shown). The second waveguide 115 is configured to confine and transport light. The second waveguide 115 is arranged laterally beside the first waveguide 112. In some embodiments, the first and second waveguides 112, 115 are arranged close enough to one another such that although they are not directly contacting one another, the first and second waveguides 112, 115 are optically coupled to one another. In such embodiments, the first waveguide 112 is laterally offset from the second waveguide 115 by a non-zero distance. In some embodiments, the inactive region 304 of the first waveguide 112 is the nearest portion of the first waveguide 112 to the second waveguide 115. Thus, the heater structure 111 does not interfere with the optical coupling directly between the inactive region 304 of the first waveguide 112 and the second waveguide 115.

As illustrated in the top view 400a of FIG. 4A, the heater structure 111 has an arc-like shape that confirms to the ring-like shape of the first waveguide 112. Further, within the active region 302 of the first waveguide 112, the first doped region 112a, the second doped region, 112b, and the center undoped region 112c are spaced laterally between sidewalls of the heater pillar structure 108. This, in part, ensures that the heater structure 111 may direct and confine heat to the active region 302 of the first waveguide, thereby minimizing heat that may affect the transmission of light through the second waveguide 115.

Figure 4B:
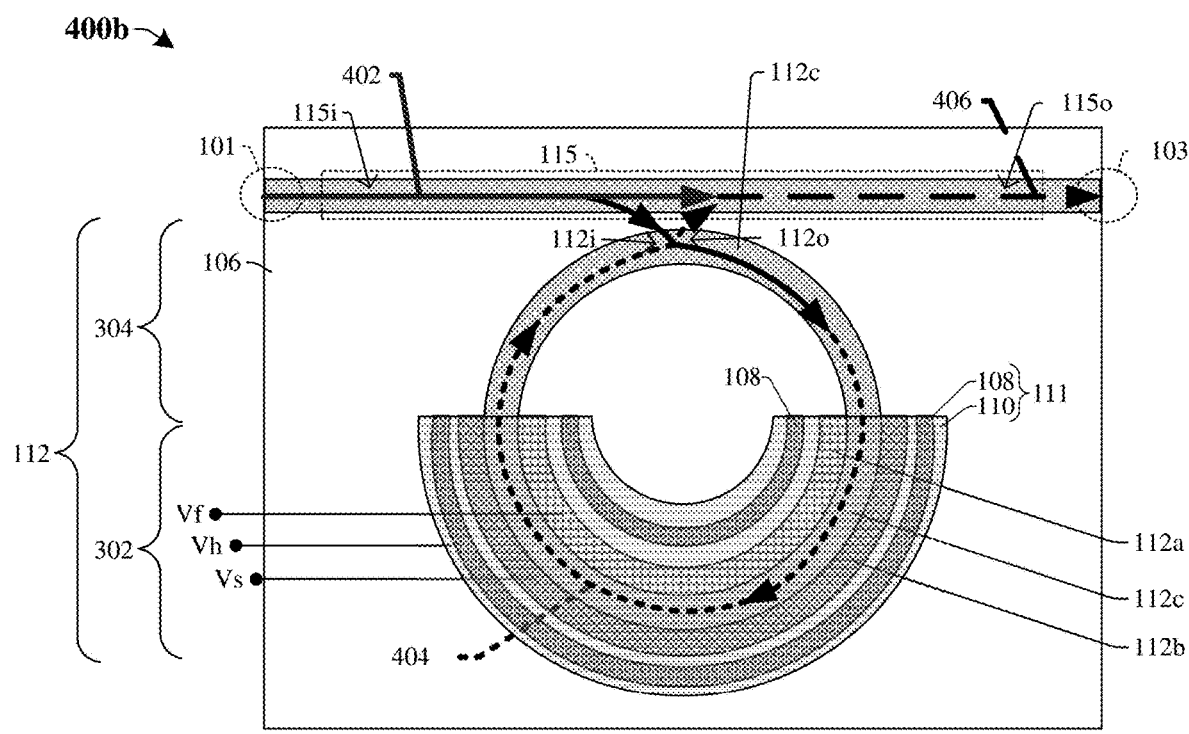

FIG. 4B illustrates a top view 400b of some embodiments of an exemplary light path passing through a modulator device that has a heater structure 111 disposed within and/or around an active region 302 of a first waveguide 112.

In some embodiments, during operation of the modulator device, light having a first phase travels through a first exemplary light pathway 402 along the second waveguide 115. The first exemplary light pathway 402 may travel into the inactive region 304 of the first waveguide 112 through the first input region 112i because the first and second waveguides 112, 115 are optically coupled together. The light may then enter a second exemplary light pathway 404, where voltage may be selectively applied across a first terminal Vf and a second terminal Vs coupled to the first doped region 112a and the second doped region 112b, respectively, of the first waveguide 112. Further, as the light travels through the second exemplary light pathway 404, a heater voltage may be selectively applied to a heater terminal Vh that is coupled to the heater structure 111, such that the light changes from the first phase to a second phase while within the active region 302 of the first waveguide 112. As the light travels along the second exemplary light pathway 404, the heater structure 111 may direct and/or confine heat to the active region 302 of the first waveguide 112, such that the first phase may change to the second phase accurately and efficiently. After passing through the active region 302 of the first waveguide 112, the light in the second exemplary light pathway 404 may then exit the inactive region 304 of the first waveguide 112 through the first output region 112o and combine with the first exemplary light pathway 402. Subsequently, in some embodiments, after exiting through the first output region 112o, the light may enter a third exemplary light pathway 406, where the light has a third phase due to constructive and/or destructive interference between light traveling through the first and second exemplary light pathways 402, 404. Thus, when the active region 302 of the first waveguide 112 is "ON" (i.e., voltages are applied to Vf, Vs, and/or Vh), light may be selectively changed or modulated according to the voltages applied to Vf, Vs, and/or Vh from a first phase to a third phase to transmit digital data through optical signals.

With reference to FIGS. 3A, 3B, 3C, 4A, and 4B, several structures and/or layers from the modulator devices 200a or 200b of FIG. 2A or 2B, such as the lower ILD structure (206 of FIG. 2A or 2B) and/or the upper ILD structure (214 of FIG. 2A or 2B), have been omitted from FIGS. 3A, 3B, 3C, 4A, and 4B for ease of illustration. Further, the upper conductive body 110 of the heater structure 111 is at least partially transparent in the FIGS. 3A, 3B, 3C, 4A, and 4B to more easily illustrate the location/layout of layers and/or structures underlying the upper conductive body 110.

Figure 5:
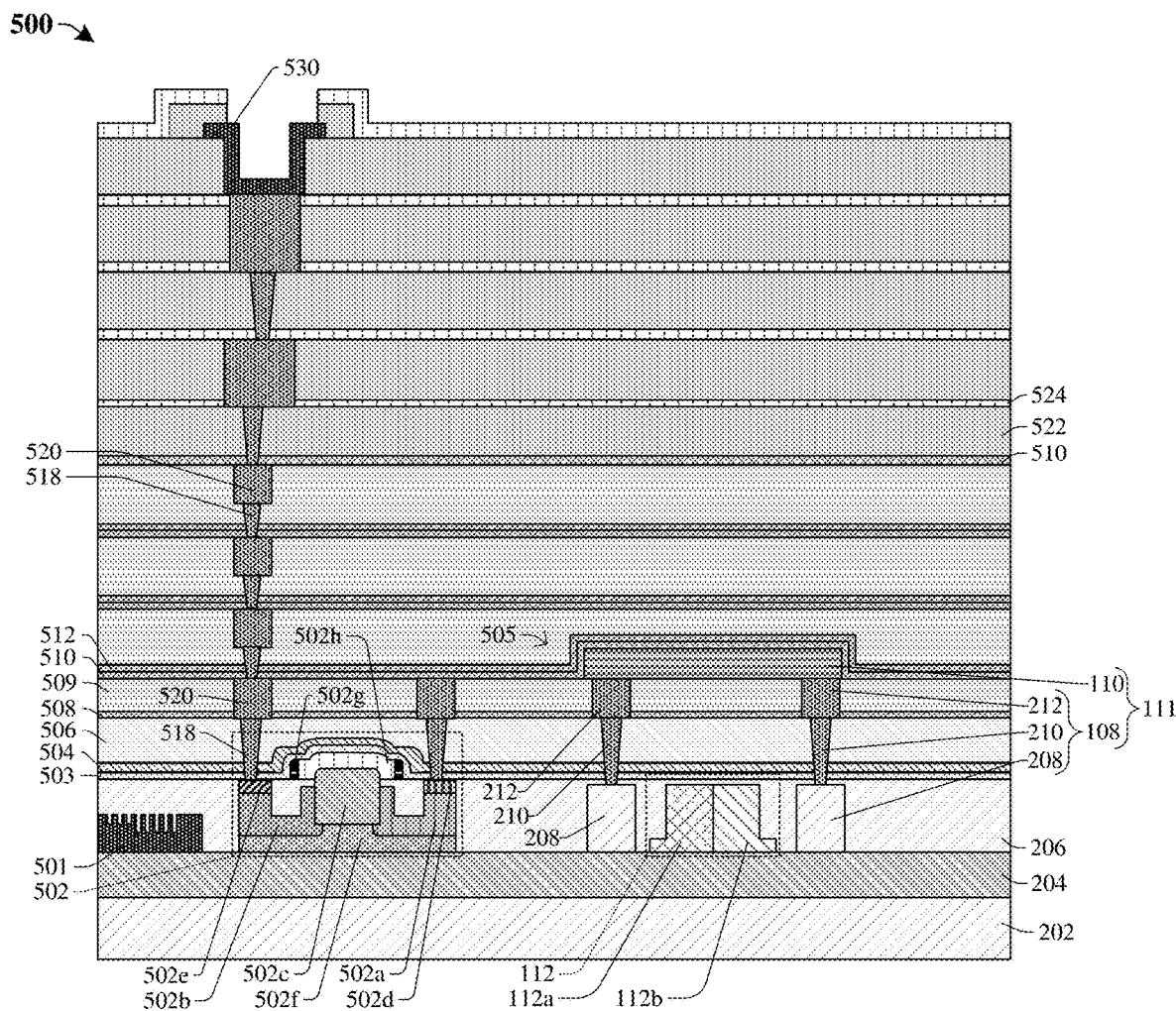
FIG. 5 illustrates a cross-sectional view of some embodiments of an integrated chip including a modulator device, a grating structure, and a photodiode disposed over a substrate.

FIG. 5 illustrates a cross-sectional view of some embodiments of an integrated chip 500 including a modulator device 505 disposed next to a photodiode 502 and overlying a substrate 202. In some embodiments, the modulator device 505 is configured as the modulator devices 200a or 200b of FIG. 2A or 2B.

A grating structure 501 overlies the substrate 202, such that the photodiode 502 is disposed laterally between the modulator device 505 and the grating structure 501. The modulator device 505 includes the heater structure 111 and the first waveguide 112. The grating structure 501 may be coupled to a light source, and may guide light from the light source into one or more of the other devices (e.g., the photodiode 502, the modulator device 505, etc.) overlying the substrate 202. The photodiode 502 may be configured to receive light and transmit the light into a digital signal. In some embodiments, one or more photodiodes 502 may be coupled to the first waveguide 112 and/or the second waveguide (115 of FIG. 2A or 2B). The photodiode 502 and/or grating structure 501 are each laterally offset from the heater structure 111, such that heat generated by the heater structure 111 is isolated from the photodiode 502 and/or grating structure 501. Further, by virtue of the materials the heater structure 111 is comprises of and/or a shape of the heater structure 111, the heat may be confined to an active region of the first waveguide 112.

The photodiode 502 may directly contact the bulk dielectric structure 204 and be disposed within the lower ILD structure 206. The photodiode 502 may comprise a semiconductor material and includes a photodiode p-type side 502a, a photodiode n-type side 502b, and a photodiode undoped center portion 502c disposed over a photodiode contact layer 502f. In some embodiments, a photodiode p+ portion 502d may be arranged over the photodiode p-type side 502a, and a photodiode n+ portion 502e may be arranged over the photodiode n-type side 502b. The photodiode p+ portion 502d and the photodiode n+ portion may each be coupled to a conductive via 518. A first photodiode insulator layer 502h may be arranged over the photodiode undoped center portion 502c and a sidewall spacer structure 502g laterally surrounds the first photodiode insulator layer 502h. In some embodiments, the photodiode p-type side 502a, photodiode n-type side 502b, and photodiode undoped center portion 502c may comprise a different semiconductor material than the first waveguide 112. In some embodiments, the first waveguide 112 may comprise silicon, whereas the photodiode p-type side 502a, photodiode n-type side 502b, and photodiode undoped center portion 502c may each comprise germanium.

In some embodiments, a plurality of conductive vias 518 and a plurality of conductive wires 520 are disposed within an interconnect structure overlying the substrate 202. The plurality of conductive vias and wires 518, 520 are configured to electrically couple semiconductor devices overlying the substrate 202 to one another. In further embodiments, a conductive via 518 contacts and/or is electrically coupled the first doped region 112a of the first waveguide 112 (not shown), and a conductive via 518 contacts and/or is electrically coupled to the second doped region 112b of the first waveguide 112. Thus, a signal (e.g. a voltage, a current, etc.) may be applied across the first waveguide 112 by way of the conductive vias 518 and/or conductive wires 520.

The plurality of conductive vias and/or wires 518, 520 are disposed within a plurality of dielectric layers that overlie the substrate. For example, the plurality of dielectric layers includes a first dielectric layer 503 and a second dielectric layer 504 overlying the lower ILD structure 206. In some embodiments, the first and second dielectric layers 503, 504 may, for example, be configured to protect the photodiode 502 and may each be or comprise silicon carbide, silicon nitride, silicon dioxide, or the like. A third dielectric layer 506 overlies the second dielectric layer 504 and may, for example, be or comprise an oxide, such as silicon dioxide, a low-k dielectric material, silicon oxynitride, or the like. A lower etch stop layer 508 overlies the third dielectric layer 506. In some embodiments, the lower etch stop layer 508 may, for example, be or comprise silicon nitride, silicon carbide, or the like. An inter-level dielectric (ILD) layer 509 overlies the lower etch stop layer 508. In further embodiments, the ILD layer 509 may, for example, be or comprise silicon dioxide, another oxide, a low-k dielectric material, an extreme low-k dielectric material, or the like. An upper etch stop layer 510 overlies the ILD layer 509. In further embodiments, the upper etch stop layer 510 may, for example, be or comprise silicon nitride, silicon carbide, silicon oxycarbide, or another suitable dielectric material. A fourth dielectric layer 512 overlies the upper etch stop layer 510. In some embodiments, the fourth dielectric layer 512 may, for example, be or comprise tetraethyl-orthosilicate (TEOS), or another suitable dielectric material. Further, a first passivation layer 522 and a second passivation layer 524 are disposed over the upper etch stop layer 510. In some embodiments, the first passivation layer 522 may, for example, be or comprise undoped silicate glass, or another suitable dielectric material. In further embodiments, the second passivation layer 524 may, for example, be or comprise silicon nitride, silicon carbide, or the like. In some embodiments, a bond pad 530 overlies the plurality of conductive vias 518 and the plurality of conductive wires 520, such that the bond pad 530 is electrically coupled to the photodiode 502 by way of the conductive vias and wires 518, 520. The bond pad 530 may be configured to electrically couple semiconductor devices disposed over the substrate 202 to another integrated chip (not shown).

In some embodiments, the upper conductive body 110 of the heater structure 111 is disposed along an upper surface of the ILD layer 509 overlying the lower etch stop layer 508. Further, the heater wires 212 of the heater pillar structure 108 are laterally enclosed by the ILD layer 509 and the lower etch stop layer 508. Furthermore, in some embodiments, a bottom surface and a top surface of the heater wires 212 are respectively aligned with a bottom surface and a top surface of conductive wires 520 disposed within a bottommost layer of the plurality of conductive wires 520. In some embodiments, the bottommost layer of the plurality of conductive wires 520 is formed concurrently with the heater wires 212, for example, by a single damascene process or a dual damascene process. Furthermore, the heater vias 210 extend from the heater wires 212 to lower pillar structure 208 through the first, second, and third dielectric layers 503, 504, 506. In some embodiments, a bottom surface and a top surface of the heater vias 210 are respectively aligned with a bottom surface and a top surface of conductive vias 518 disposed within a bottommost layer of the plurality of conductive vias 518. In some embodiments, the bottommost layer of the plurality of conductive vias 518 is formed concurrently with the heater vias 210, for example, by a single damascene process or a dual damascene process. In some embodiments, the conductive vias 518 and the heater vias 210 may, for example, be or comprise a same material, such as copper, aluminum, tungsten, any combination of the foregoing, or the like. In further embodiments, the conductive wires 520 and the heater wires 212 may, for example, be or comprise a same material, such as copper, aluminum, tungsten, any combination of the foregoing, or the like.

FIGS. 6-12 illustrate cross-sectional views 600-1200 of some embodiments of a method for forming a modulator device having a heater structure that overlies and at least partially laterally surrounds a waveguide structure according to the present disclosure. Although the cross-sectional views 600-1200 shown in FIGS. 6-12 are described with reference to a method, it will be appreciated that the structures shown in FIGS. 6-12 are not limited to the method but rather may stand alone separate of the method. Although FIGS. 6-12 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 6:
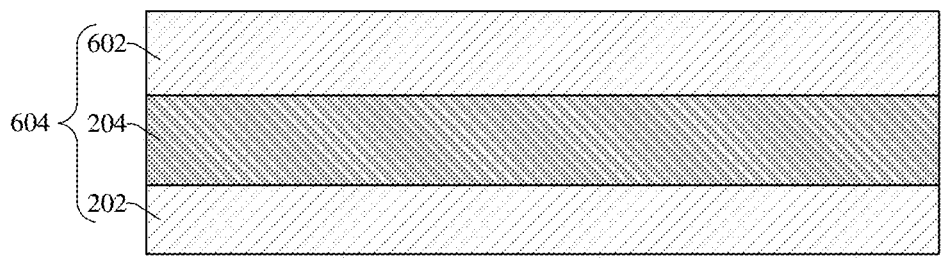
FIGS. 6-12 illustrate cross-sectional views of some embodiments of a method for forming a modulator device that includes a heater structure and a first waveguide, where the heater structure directly overlies and at least partially laterally surrounds the first waveguide.

As shown in cross-sectional view 600 of FIG. 6, a semiconductor substrate structure 604 is provided. In some embodiments, the semiconductor substrate structure 604 may, for example, be or comprise a silicon-on-insulator (SOI) substrate. The semiconductor substrate structure 604 may include a substrate 202, a bulk dielectric structure 204, and a device layer 602. The bulk dielectric structure 204 is disposed between the device layer 602 and the substrate 202. In further embodiments, the bulk dielectric structure 204 is formed over the substrate 202 and the device layer 602 is formed over the bulk dielectric structure 204. In some embodiments, the bulk dielectric structure 204 may, for example, be or comprise an oxide, such as silicon dioxide, or another suitable dielectric material. In further embodiments, the substrate 202 and/or the device layer 602 may, for example, respectively be or comprise intrinsic silicon, bulk silicon, another suitable bulk substrate material, or the like. In some embodiments, the device layer 602 comprises a same material as the substrate 202.

Figure 7:
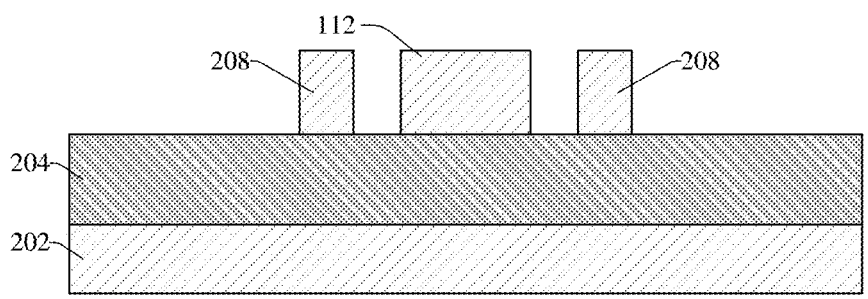

As shown in cross-sectional view 700 of FIG. 7, the device layer (602 of FIG. 6) is patterned, thereby defining a first waveguide 112 and a lower pillar structure 208. In some embodiments, the patterning process further defines a second waveguide (115 of FIG. 3A-C or 4A-B) that is optically coupled to the first waveguide 112. In yet further embodiments, a top view layout of the first waveguide 112 and/or the second waveguide (115 of FIG. 3A-C or 4A-B) after the patterning process of FIG. 7 may correspond to the top views 300a-c or 400a-b of FIG. 3A-C or 4A-B. Thus, in some embodiments, the first waveguide 112, the second waveguide (115 of FIG. 3A-C or 4A-B), and the lower pillar structure 208 are formed concurrently. Further, the first waveguide 112 is formed in such a manner that it is spaced laterally between inner sidewalls of the lower pillar structure 208. In some embodiments, the patterning process may include: forming a masking layer (not shown) over the device layer (602 of FIG. 6); exposing unmasked regions of the device layer (602 of FIG. 6) to one or more etchants, thereby defining the first waveguide 112, the lower pillar structure 208, and the second waveguide (115 of FIG. 3A-C or 4A-B); and performing a removal process to remove the masking layer.

Figure 8:
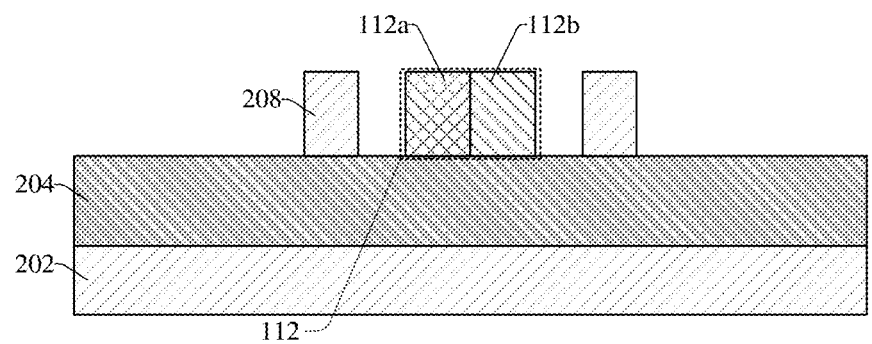

As shown in cross-sectional view 800 of FIG. 8, an ion implant process is performed on the first waveguide 112 to define a first doped region 112a and a second doped region 112b within the first waveguide 112. In some embodiments, the first doped region 112a comprises a first doping type (e.g. p-type), and the second doped region 112b comprises a second doping type (e.g., n-type) opposite the first doping type. In various embodiments, the first doping type is n-type and the second doping type is p-type, or vice versa. In further embodiments, the ion implant process includes selectively implanting ions into the first waveguide 112 according to one or more masking layers (not shown). For example, a first selective-ion implant process may be performed to define the first doped region 112a, and a second selective-ion implant process may be performed to define the second doped region 112b. In further embodiments, the ion implant process defines an active region (e.g., 302 of FIG. 3A-C or 4A-B) of the first waveguide 112 as illustrated and/or described in FIG. 3A-C or 4A-B.

Figure 9:
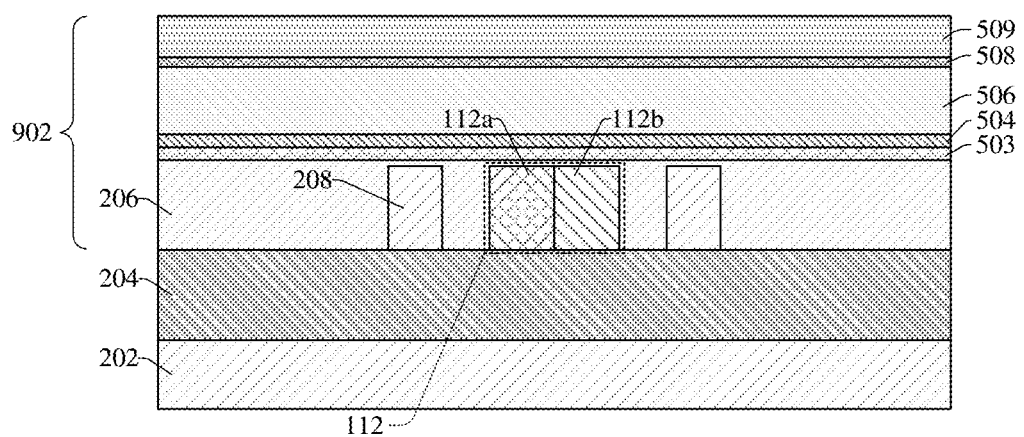

As shown in cross-sectional view 900 of FIG. 9, a stack of dielectric layers 902 is formed over the bulk dielectric structure 204, the first waveguide 112, and the lower pillar structure 208. In some embodiments, the stack of dielectric layers 902 includes a lower inter-level dielectric (ILD) structure 206, a first dielectric layer 503, a second dielectric layer 504, a third dielectric layer 506, a lower etch stop layer 508, and an ILD layer 509. In some embodiments, the layers within the stack of dielectric layers 902 may, for example, respectively be deposited by physical vapor deposition (PVD), chemical vapor deposition (CVD), atomic layer deposition (ALD), or another suitable deposition process. In some embodiments, the first and second dielectric layers 503, 504 may, for example, each be or comprise silicon carbide, silicon nitride, silicon dioxide, or the like. In further embodiments, the lower ILD structure 206 and/or the third dielectric layer 506 may, for example, respectively be or comprise silicon nitride, silicon oxynitride, silicon carbide, silicon dioxide, borosilicate glass (BSG), phosphoric silicate glass (PSG), borophosphosilicate glass (BPSG), a low-k dielectric material, or another suitable dielectric material. In yet further embodiments, the lower etch stop layer 508 may, for example, be or comprise silicon nitride, silicon carbide, or the like. In some embodiments, the ILD layer 509 may, for example, be or comprise an oxide, such as silicon dioxide, a low-k dielectric material, an extreme low-k dielectric material, any combination of the foregoing, or another suitable dielectric material.

Figure 10:
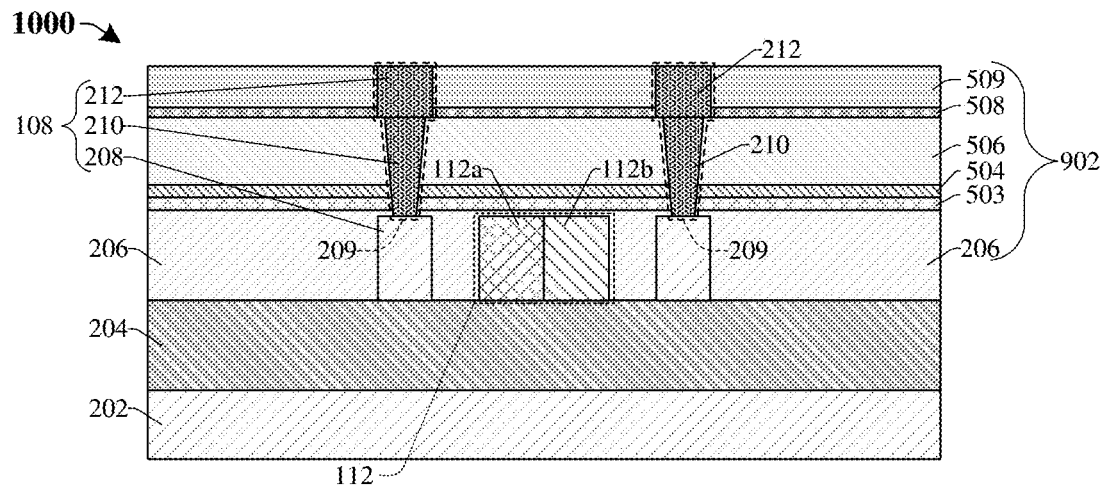

As shown in cross-sectional view 1000 of FIG. 10, an upper pillar structure 209 is formed over the lower pillar structure 208, thereby defining the heater pillar structure 108. The heater pillar structure 108 may include the lower pillar structure 208 and the upper pillar structure 209. In some embodiments, the upper pillar structure 209 includes heater vias 210 and heater wires 212. In various embodiments, the heater vias 210 may be formed within the first, second, and third dielectric layers 503, 504, and 506 before the lower etch stop layer 508 is deposited over the third dielectric layer 506. In some embodiments, the heater vias 210 may be formed by a single damascene process and/or may be formed concurrently with a bottommost layer of conductive vias (518 of FIG. 5). The heater wires 212 are formed within the lower etch stop layer 508 and the ILD layer 509. In some embodiments, the heater wires 212 may be formed by a single damascene process and/or may be formed concurrently with the bottommost layer of conductive wires (520 of FIG. 5).

In some embodiments, a single damascene process used to define the heater vias 210 may include: forming a masking layer (not shown) over the third dielectric layer 506 before the upper etch stop layer 508 is deposited; patterning the first, second, third dielectric layers 503, 504, and 506 and the lower ILD structure 206, thereby exposing an upper surface of the lower pillar structure 208 and defining a plurality of heater via openings; depositing (e.g., by CVD, PVD, sputtering, electroless plating, etc.) a conductive material (e.g., copper, aluminum, tungsten, any combination of the foregoing, or the like) in the heater via openings; and performing a planarization process (e.g., a chemical mechanical planarization (CMP) process) into the conductive material until an upper surface of the third dielectric layer 506 is reached, thereby defining the heater vias 210. In some embodiments, a similar single damascene process may be performed to form the heater wires 212, in which the patterning process defines a plurality of heater wire openings within the lower etch stop layer 508 and the ILD layer 509 and exposes and an upper surface of the heater vias 210.

In yet further embodiments, the heater vias 210 and the heater wires 212 may be formed concurrently. In such embodiments, a process for forming the upper pillar structure 209 may include: forming a masking layer (not shown) over the ILD layer 509; patterning the stack of dielectric layers 902 according to the masking layer, thereby defining an upper pillar structure opening and exposing an upper surface of the lower pillar structure 208; depositing a conductive material (e.g., tungsten, aluminum, copper, any combination of the foregoing, etc.) in the upper pillar structure opening; and performing a planarization process (e.g., a CMP process) into the conductive material until an upper surface of the ILD layer 509 is reached, thereby defining the upper pillar structure 209, which includes the heater vias 210 and the heater wires 212.

Figure 11:
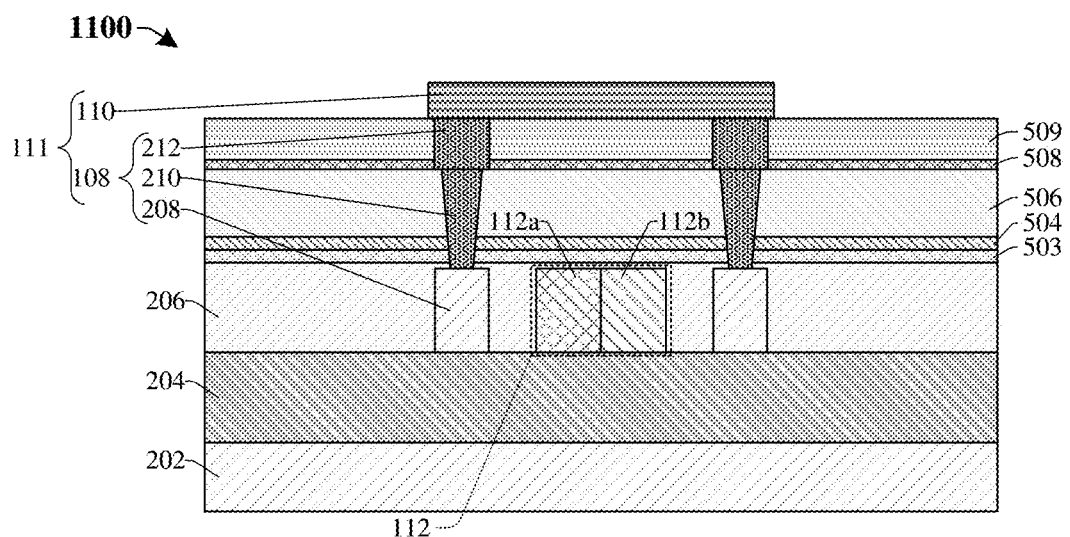

As shown in cross-sectional view 1100 of FIG. 11, an upper conductive body 110 is formed along an upper surface of the heater wires 212 and the ILD layer 509, thereby defining a heater structure 111. In some embodiments, a top view layout of the heater structure 111 may correspond to the layout of the heater structure 111 in the FIG. 3A-C or 4A-B, such that the heater structure 111 directly overlies and at least partially laterally surrounds the active region of the first waveguide 112. In various embodiments, the upper conductive body 110 is formed in such a manner that it directly overlies the first waveguide 112 and/or continuously laterally extends between outer sidewalls of the heater pillar structure 108. In some embodiments, a process for forming the upper conductive body 110 includes: depositing (e.g. by CVD, PVD, sputter, electroplating, etc.) a conductive layer (e.g., titanium nitride, tantalum nitride, titanium, etc.) over the upper surface of the ILD layer 509; forming a masking layer (not shown) over the conductive layer; and patterning the conductive layer according to the masking layer, thereby defining the upper conductive body 110.

Figure 12:
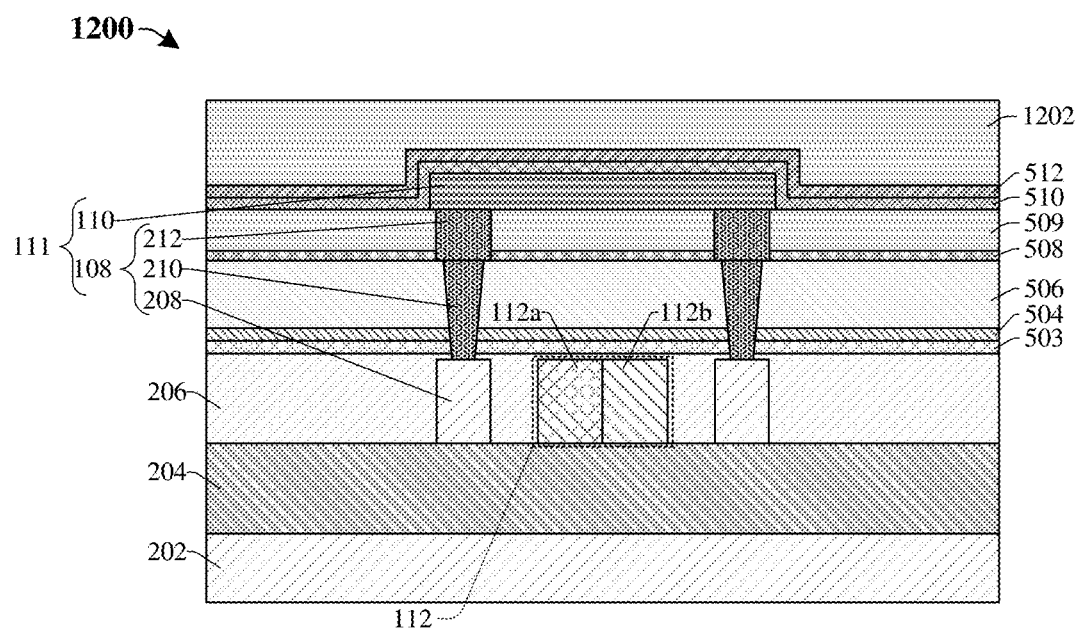

As shown in cross-sectional view 1200 of FIG. 12, an upper etch stop layer 510 is formed over the upper conductive body 110 and the ILD layer 509. In some embodiments, the upper etch stop layer 510 may, for example, be or comprise silicon nitride, silicon carbide, or another suitable dielectric material. Further, the upper etch stop layer 510 may extend along sidewalls and an upper surface of the upper conductive body 110. A fourth dielectric layer 512 is formed over the upper etch stop layer 510. In some embodiments, the fourth dielectric layer 512 may, for example, be or comprise tetraethyl orthosilicate (TEOS), or another suitable dielectric material. Furthermore, a second ILD layer 1202 is formed over the fourth dielectric layer 512. In some embodiments, the upper etch stop layer 510, the fourth dielectric layer 512, and/or the second ILD layer 1202 may respectively, for example, be deposited by PVD, CVD, ALD, or another suitable deposition process. In further embodiments, the second ILD layer 1202 comprises a same material as the ILD layer 509.

Figure 13:
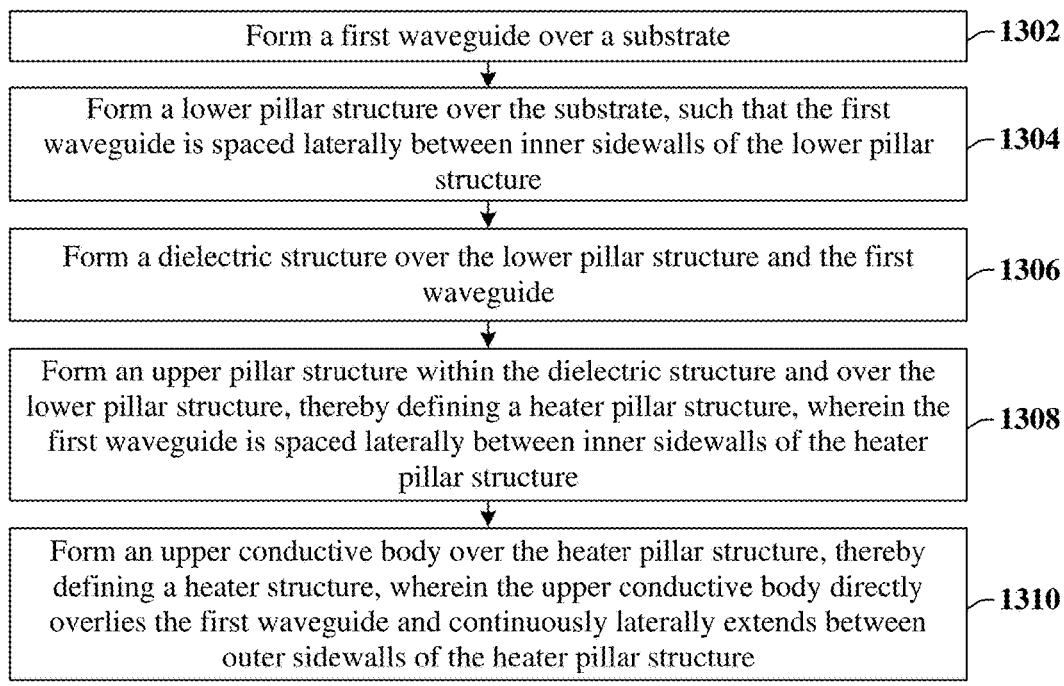
FIG. 13 illustrates a flow diagram of some embodiments corresponding to the method of FIGS. 6-12.

FIG. 13 illustrates a method 1300 for forming a modulator device including a heater structure that directly overlies and at least partially laterally surrounds an underlying waveguide structure according to the present disclosure. Although the method 1300 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 1302, a first waveguide is formed over a substrate. FIG. 7 illustrates a cross-sectional view 700 corresponding to some embodiments of act 1302.

At act 1304, a lower pillar structure is formed over the substrate, such that the first waveguide is spaced laterally between inner sidewalls of the lower pillar structure. FIG. 7 illustrates a cross-sectional view 700 corresponding to some embodiments of act 1304.

At act 1306, a dielectric structure is formed over the lower pillar structure and the first waveguide. FIG. 9 illustrates a cross-sectional view 900 corresponding to some embodiments of act 1306.

At act 1308, an upper pillar structure is formed within the dielectric structure and other the lower pillar structure, thereby defining a heater pillar structure. The first waveguide is spaced laterally between inner sidewalls of the heater pillar structure. FIG. 10 illustrates a cross-sectional view 1000 corresponding to some embodiments of act 1308.

At act 1310, an upper conductive body is formed over the heater pillar structure, thereby defining a heater structure. The upper conductive body directly overlies the first waveguide and continuously laterally extends between outer sidewalls of the heater pillar structure. FIG. 11 illustrates a cross-sectional view 1100 corresponding to some embodiments of act 1310.

Accordingly, in some embodiments, the present disclosure relates to a modulator device including a heater structure and a waveguide structure, where the heater structure directly overlies and at least partially laterally surrounds the waveguide structure.

In some embodiments, the present application provides a modulator device including an input terminal configured to receive impingent light; a first waveguide having a first input region and a first output region, wherein the first input region is coupled to the input terminal; a second waveguide optically coupled to the first waveguide, wherein the second waveguide has a second input region and a second output region, wherein the second input region is coupled to the input terminal; an output terminal configured to provide outgoing light that is modulated based on the impingent light, wherein the output terminal is coupled to the first output region of the first waveguide and the second output region of the second waveguide; and a heater structure overlying the first waveguide, wherein a bottom surface of the heater structure is aligned with a bottom surface of the first waveguide, wherein the first waveguide is spaced laterally between sidewalls of the heater structure.

In some embodiments, the present application provides a modulator device including a first waveguide arranged over a substrate and including an active region configured to modulate light; a second waveguide arranged over the substrate and optically coupled to the first waveguide; a first dielectric structure arranged over the first and second waveguides; a heater structure embedded within the first dielectric structure and overlying the active region of the first waveguide, wherein the heater structure includes an upper conductive body directly overlying the active region of the first waveguide; and a heater pillar structure continuously extending from the upper conductive body to a point beneath an upper surface of the first waveguide, wherein the first waveguide is laterally between inner sidewalls of the heater pillar structure, wherein the first waveguide is laterally offset from the inner sidewalls of the heater pillar structure by a non-zero distance.

In some embodiments, the present application provides a method for forming a modulator device, the method includes forming a first waveguide over a substrate; forming a lower pillar structure over the substrate, wherein the first waveguide is spaced laterally between inner sidewalls of the lower pillar structure; depositing a dielectric structure over the first waveguide and the lower pillar structure; forming an upper pillar structure over the lower pillar structure, wherein the upper pillar structure is embedded within the dielectric structure; and forming an upper conductive body along an upper surface of the dielectric structure and an upper surface of the upper pillar structure, thereby defining a heater structure, wherein the heater structure includes the lower pillar structure, the upper pillar structure, and the upper conductive body, wherein the upper conductive body directly overlies the first waveguide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated chip, comprising:
   a waveguide disposed on a substrate and comprising an active region that extends continuously along a first distance; and
   a heater structure overlying the waveguide, wherein the heater structure comprises a conductive structure over the active region and a vertical structure disposed between the conductive structure and the substrate, wherein the vertical structure comprises a conductive upper vertical segment and a lower vertical segment, wherein the lower vertical segment comprises a material different than that of the conductive upper vertical segment, and wherein the heater structure is configured to direct heat from the conductive structure towards the waveguide via the lower vertical segment and the conductive upper vertical segment.

2. The integrated chip of claim 1, wherein the active region comprises a first doped region that continuously extends along the first distance.

3. The integrated chip of claim 2, wherein the conductive structure and the conductive upper vertical segment continuously laterally extend across a second distance that is greater than or equal to the first distance, wherein the conductive upper vertical segment comprises a metal via and a metal wire that continuously laterally extend along the second distance in an unbroken path.

4. The integrated chip of claim 3, wherein a thickness of the conductive structure is less than a thickness of the metal wire.

5. The integrated chip of claim 1, wherein a top surface of the vertical structure directly contacts a bottom surface of the conductive structure.

6. The integrated chip of claim 1, wherein a width of the vertical structure discretely decreases at a first point below a bottom surface of the conductive structure and discretely increases at a second point below the first point, wherein the width of the vertical structure continuously decreases along a vertical distance between the first point and the second point.

7. The integrated chip of claim 1, further comprising:
   a conductive via disposed over and contacting the conductive structure, wherein the conductive via has a first thermal conductivity, the conductive structure has a second thermal conductivity less than the first thermal conductivity, the conductive upper vertical segment has the first thermal conductivity, and the lower vertical segment has a third thermal conductivity greater than the second thermal conductivity.

8. The integrated chip of claim 7, wherein the conductive via and the conductive upper vertical segment respectively comprise a same metal material.

9. The integrated chip of claim 1, further comprising: a conductive via over the substrate and laterally offset from the heater structure, wherein a bottom surface of the conductive via is aligned with a bottom surface of the conductive structure.

10. An integrated chip, comprising:
    a waveguide overlying a substrate, wherein the waveguide comprises an active region configured to modulate light; and
    a heater structure overlying the waveguide, wherein the heater structure comprises an upper conductive structure, an upper pillar structure below the upper conductive structure, and a lower pillar structure below the upper conductive structure, wherein the lower pillar structure has a thermal conductivity different than that of the upper pillar structure, wherein the heater structure is configured to direct heat from the upper conductive structure through the upper pillar structure and the lower pillar structure in a direction towards the active region.

11. The integrated chip of claim 10, wherein a conductive via directly overlies the active region and contacts the upper conductive structure, wherein the heater structure is configured to direct heat from the conductive via to the upper conductive structure in the direction towards the active region.

12. The integrated chip of claim 11, wherein the conductive via and the upper pillar structure respectively comprise a first material, wherein the upper conductive structure comprises a second material different than the first material.

13. The integrated chip of claim 10, wherein the heater structure is disposed on opposing sides of the active region and over a top surface of the active region, and wherein the heater structure is configured to confine heat to a region around the active region.

14. The integrated chip of claim 10, wherein the lower pillar structure and the waveguide respectively comprise a semiconductor material, and wherein the lower pillar structure is completely laterally separated from the waveguide by a dielectric structure that comprises a material different than the semiconductor material.

15. The integrated chip of claim 14, wherein the dielectric structure directly contacts and continuously extends from an inner sidewall of the lower pillar structure to an outermost sidewall of the waveguide.

16. A method for forming an integrated chip, the method comprising:
- forming a waveguide over a substrate, wherein the waveguide comprises an active region;
- forming a pillar structure over the substrate, wherein the active region is spaced laterally between sidewalls of the pillar structure, wherein the pillar structure comprises an upper pillar structure overlying a lower pillar structure, wherein the lower pillar structure comprises a material different than that of the upper pillar structure; and
- forming an upper conductive structure over the pillar structure and the waveguide, thereby defining a heater structure, wherein the heater structure is configured to direct heat from the upper conductive structure through the upper pillar structure and the lower pillar structure in a direction towards the active region.

17. The method of claim 16, wherein forming the waveguide and the pillar structure comprises:
- forming a device layer over a bulk dielectric structure, wherein the bulk dielectric structure is disposed on the substrate; and
- performing an etch process on the device layer to define the waveguide and the lower pillar structure, wherein the etch process exposes a top surface of the bulk dielectric structure in a region directly between an outer sidewall of the waveguide and an inner sidewall of the lower pillar structure.

18. The method of claim 17, wherein the etch process completely removes material of the device layer from the region.

19. The method of claim 17, further comprising:
- forming a dielectric structure over the substrate, wherein the dielectric structure is disposed within the region, and wherein the dielectric structure has a bottom surface within the region that is aligned with a bottom surface of the lower pillar structure.

20. The method of claim 16, further comprising:
- forming an etch stop layer over the upper conductive structure such that the etch stop layer continuously extends from opposing sidewalls of the upper conductive structure to a top surface of the upper conductive structure.

* * * * *